(12) United States Patent
Yamamoto et al.

(10) Patent No.: US 11,447,178 B2
(45) Date of Patent: Sep. 20, 2022

(54) TOWING ASSIST DEVICE

(71) Applicant: Clarion Co., Ltd., Saitama (JP)

(72) Inventors: Kensuke Yamamoto, Saitama (JP); Ryo Sakurai, Saitama (JP)

(73) Assignee: CLARION CO., LTD., Saitama (JP)

( * ) Notice: Subject to any disclaimer, the term of this patent is extended or adjusted under 35 U.S.C. 154(b) by 0 days.

(21) Appl. No.: 17/110,705

(22) Filed: Dec. 3, 2020

(65) Prior Publication Data
US 2021/0171099 A1 Jun. 10, 2021

(30) Foreign Application Priority Data

Dec. 9, 2019 (JP) .............................. JP2019-222032

(51) Int. Cl.
B62D 13/06 (2006.01)
B60R 11/04 (2006.01)
(52) U.S. Cl.
CPC ............. B62D 13/06 (2013.01); B60R 11/04 (2013.01)
(58) Field of Classification Search
None
See application file for complete search history.

(56) References Cited

U.S. PATENT DOCUMENTS

| 2014/0324295 | A1* | 10/2014 | Lavoie | H04N 7/183 701/41 |
| 2015/0149040 | A1* | 5/2015 | Hueger | B62D 15/028 701/41 |
| 2015/0344067 | A1 | 12/2015 | Lavoie et al. | |
| 2017/0123431 | A1* | 5/2017 | Ghneim | G06V 20/56 |
| 2019/0009817 | A1* | 1/2019 | Bradley | B62D 15/027 |
| 2019/0018132 | A1* | 1/2019 | Decker | G01S 13/931 |
| 2020/0017143 | A1* | 1/2020 | Gali | B62D 15/028 |

FOREIGN PATENT DOCUMENTS

WO WO-2019115418 A1 * 6/2019 ............. B62D 13/06

* cited by examiner

*Primary Examiner* — Rebecca A Volentine
(74) *Attorney, Agent, or Firm* — Wenderoth, Lind & Ponack, L.L.P.

(57) ABSTRACT

A towing assist device includes a controller configured to assist reversing of a vehicle to which a trailer is coupled with a coupling tool, and a monitor configured to display a periphery of the coupling tool attached to a rear portion of the vehicle with a rear view at least when the vehicle reverses, wherein the controller includes an alarm angle calculator configured to calculate an alarm angle equal to or smaller than a jackknife angle causing a jackknife phenomenon by the vehicle and the trailer in reversing, and an alarm generator configured to give an alarm when a trailer angle between the vehicle and the trailer is equal to or larger than the alarm angle.

5 Claims, 13 Drawing Sheets

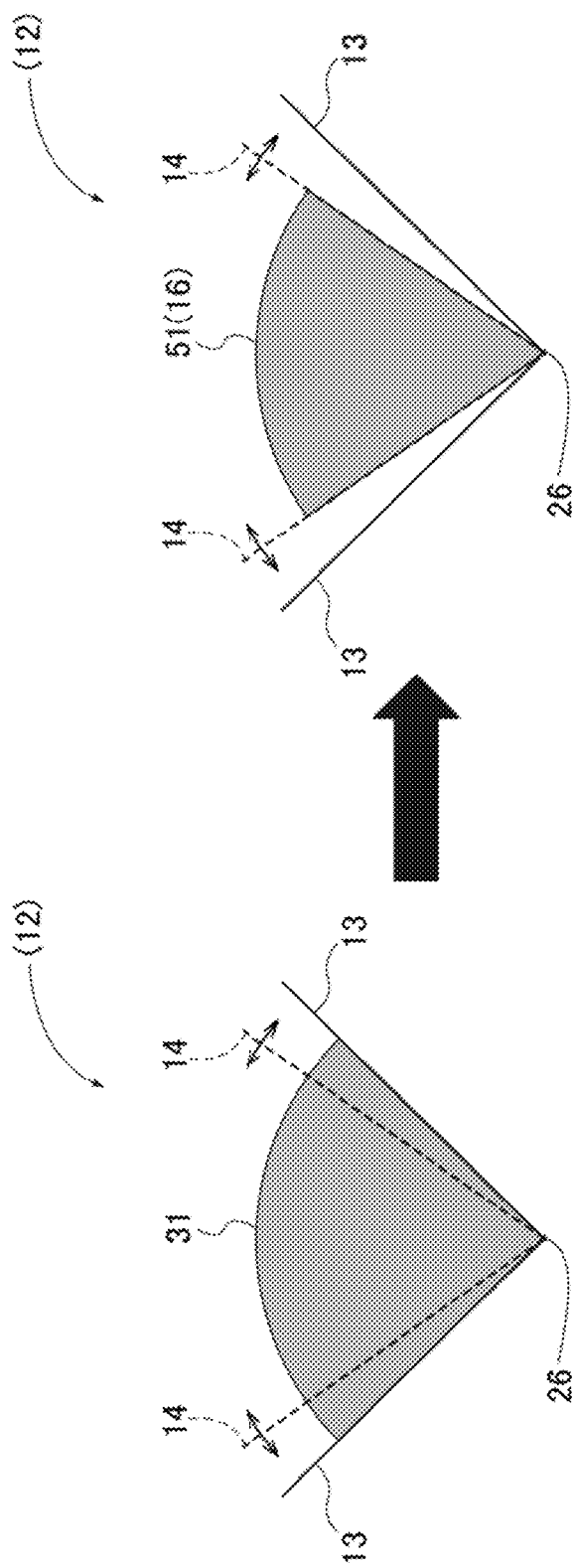

TOWING ASSIST DEVICE

CROSS-REFERENCE TO RELATED APPLICATION

The present application is based on and claims priority to Japanese patent application No. 2019-222032, filed on Dec. 9, 2019, the disclosure of which is hereby incorporated by reference herein in its entirety.

FIELD OF THE INVENTION

The present disclosure relates to a towing assist device.

BACKGROUND

A vehicle such as an automobile can tow a trailer coupled to a coupling tool attached to a rear portion of the vehicle.

In the reversing of the vehicle to which the trailer is coupled, when an angle between the vehicle and the trailer has an acute angle, the trailer may get stuck by a so-called jackknife phenomenon. When such a jackknife phenomenon occurs, the reversing vehicle may crash into the stuck trailer. It is therefore necessary for the vehicle to reverse while avoiding the jackknife phenomenon.

Accordingly, a reversing assist device is developed (see specification of US2015/0344067A1, for example). The reversing assist device is configured to control a steering operation by monitoring the reversing of the vehicle, so as to avoid the jackknife phenomenon.

The reversing assist device described in US2015/0344067A1 is configured to indirectly control the steering operation of the vehicle by turning a control knob disposed near a monitor while monitoring an angle between the vehicle and the trailer with a top view image displayed on the monitor mounted on the vehicle. This configuration makes the relationship between the image and the control knob difficult to figure out instinctively, and also makes the operation by the control knob difficult.

SUMMARY

The present disclosure has been made in view of the above problem.

According to the present disclosure, a towing assist device includes a controller configured to assist reversing of a vehicle to which a trailer is coupled with a coupling tool, and a monitor configured to display a periphery of the coupling tool attached to a rear portion of the vehicle with a rear view at least when the vehicle reverses. The controller includes an alarm angle calculator configured to calculate an alarm angle equal to or smaller than a jackknife angle causing a jackknife phenomenon by the vehicle and the trailer in reversing, and an alarm generator configured to give an alarm when a trailer angle between the vehicle and the trailer is equal to or larger than the alarm angle.

BRIEF DESCRIPTION OF DRAWINGS

FIG. 11 is a drawing illustrating a situation in which a steerable area is regulated within an inside area of the alarm angle.

DETAILED DESCRIPTION

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, an embodiment of the present disclosure will be described in details with reference to the drawings. FIGS. 1 to 16 describe the embodiment.

The configuration of the embodiment will be described below.

Figure 1:
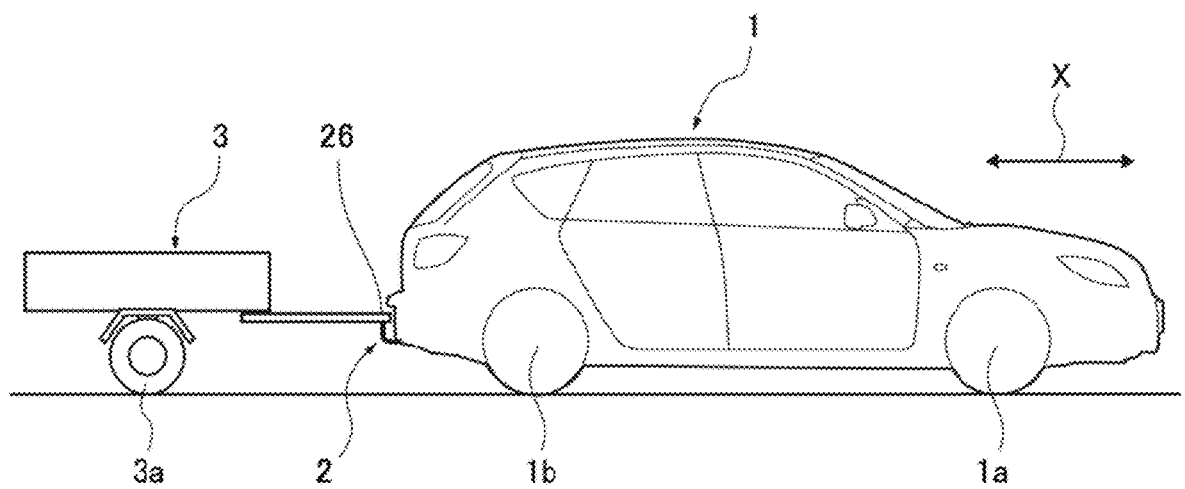
FIG. 1 is a side view of a vehicle including a towing assist device and a trailer coupled to the vehicle according to an embodiment.
Figure 2:
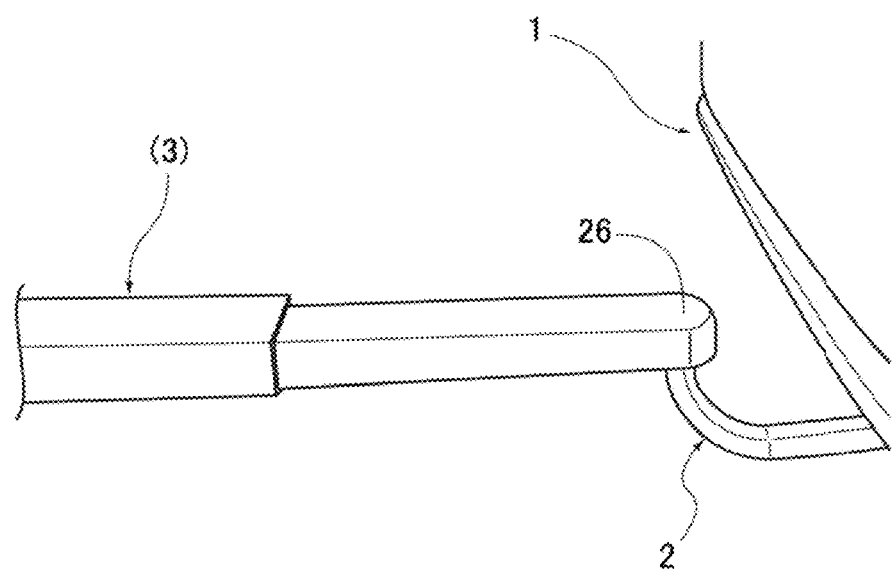
FIG. 2 is a perspective view illustrating a coupling tool in FIG. 1.

As illustrated in FIG. 1, a vehicle 1 such as an automobile tows a trailer 3 coupled to a coupling tool 2 (FIG. 2) attached to a rear portion of the vehicle 1.

Figure 3:
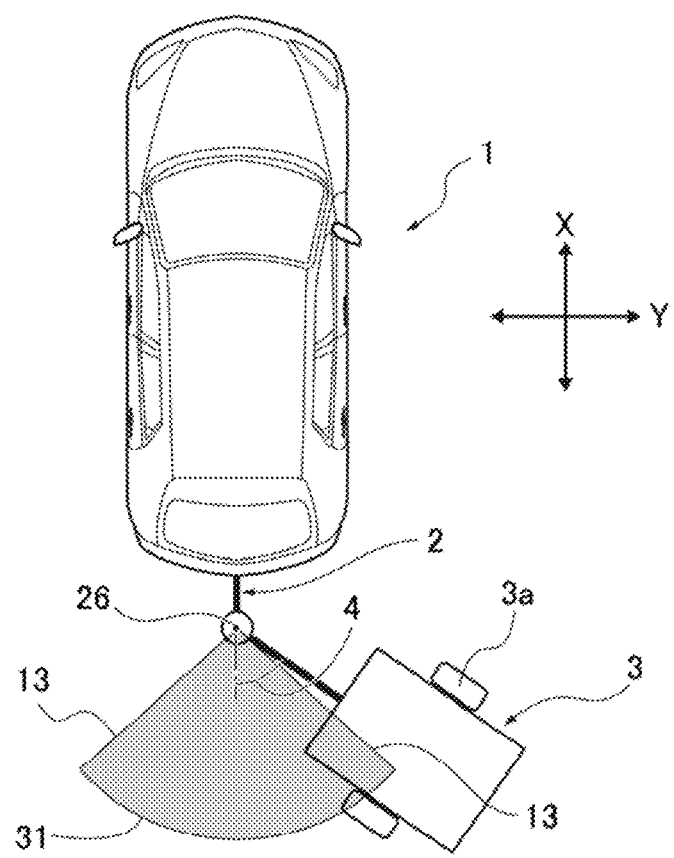
FIG. 3 is a plan view illustrating a trailer angle between the vehicle and the trailer.

As the vehicle 1 to which the trailer 3 (towing vehicle) is coupled differs from a normal vehicle in a behavior, a driver needs to be experienced. For example, the vehicle 1 and the trailer 3 have therebetween a speed difference and an angle change by the inertia of the trailer 3 when the vehicle 1 accelerates and decelerates. These speed difference and angle change may cause a so-called jackknife phenomenon in which the vehicle 1 and the trailer 3 are aligned into an L shape. It is therefore necessary to avoid the jackknife phenomenon. It is especially difficult for a driver of the towing vehicle to reverse the towing vehicle. When an angle (trailer angle 4 in FIG. 3) between the vehicle 1 and the trailer 3 is a predetermined angle (jackknife angle 13) or more, or the vehicle 1 and the trailer 3 are aligned at an acute angle, the trailer 3 gets stuck due to the jackknife phenomenon. The trailer angle 4 may be represented as a swing angle of the trailer 3 in a right and left direction (vehicle width direction Y) with a vehicle longitudinal direction X as 0 degree (for example, + angle in right direction and − angle in left direction, and vice versa). An inside area of a fan-shaped range in FIG. 3 is a jackknife phenomenon free range (after-described steering allowable area 31) defined by an angle smaller than the jackknife angle 13.

Figure 4:
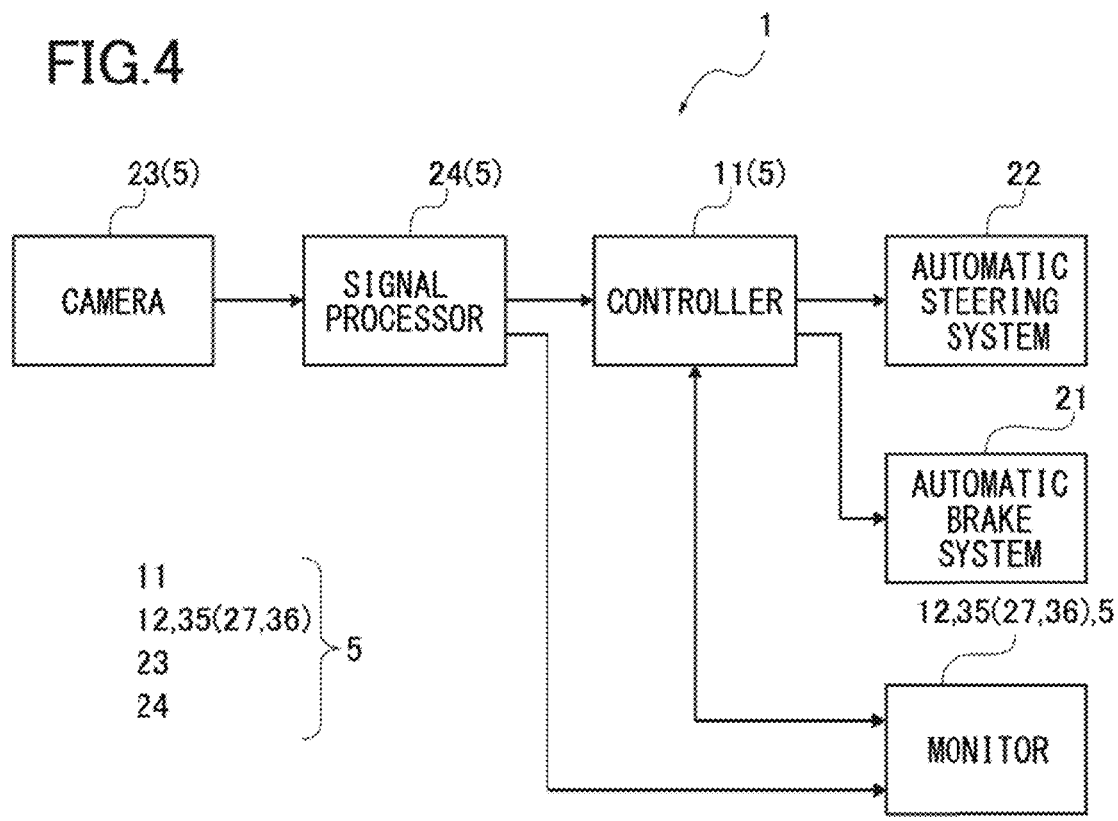
FIG. 4 is a block diagram illustrating an outline of the towing assist device.

The vehicle 1 that tows the trailer 3 is equipped with a towing assist device 5 as illustrated in FIG. 4. The towing assist device 5 of the embodiment assists the reversing of the vehicle 1 to avoid the jackknife phenomenon. The towing assist device 5 is mounted on the vehicle 1 to be a part of the vehicle 1.

The towing assist device 5 includes the following configuration.

The basic configuration of the towing assist device 5 will be described.

Figure 5:
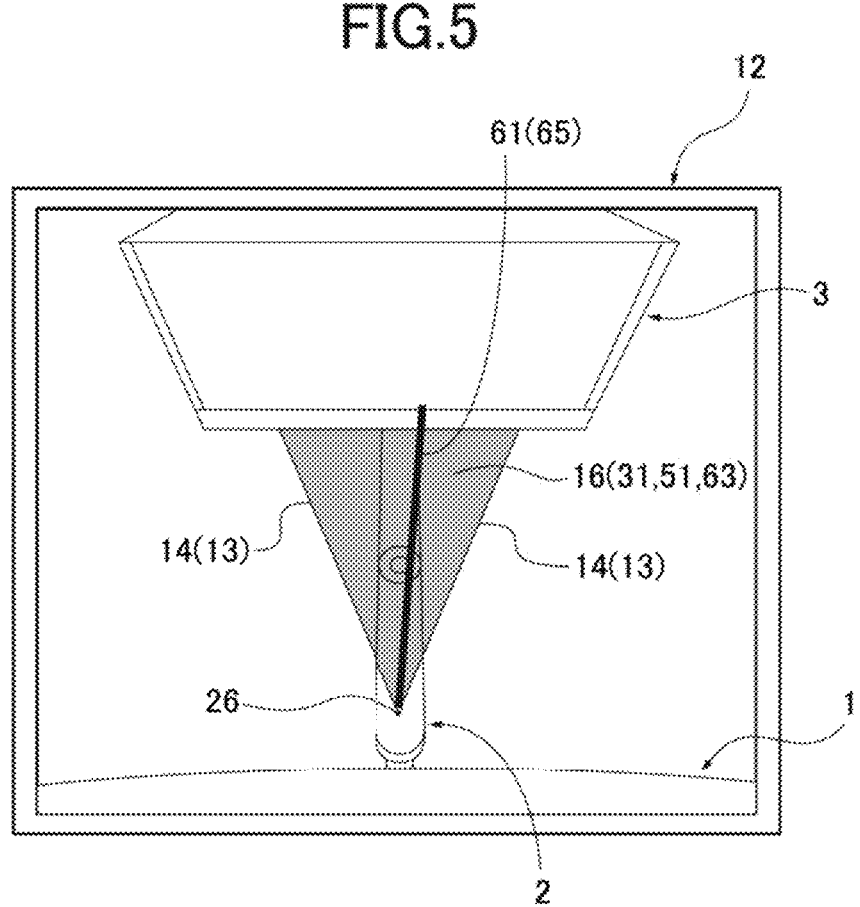
FIG. 5 is a drawing illustrating a display of a monitor.
Figure 6:
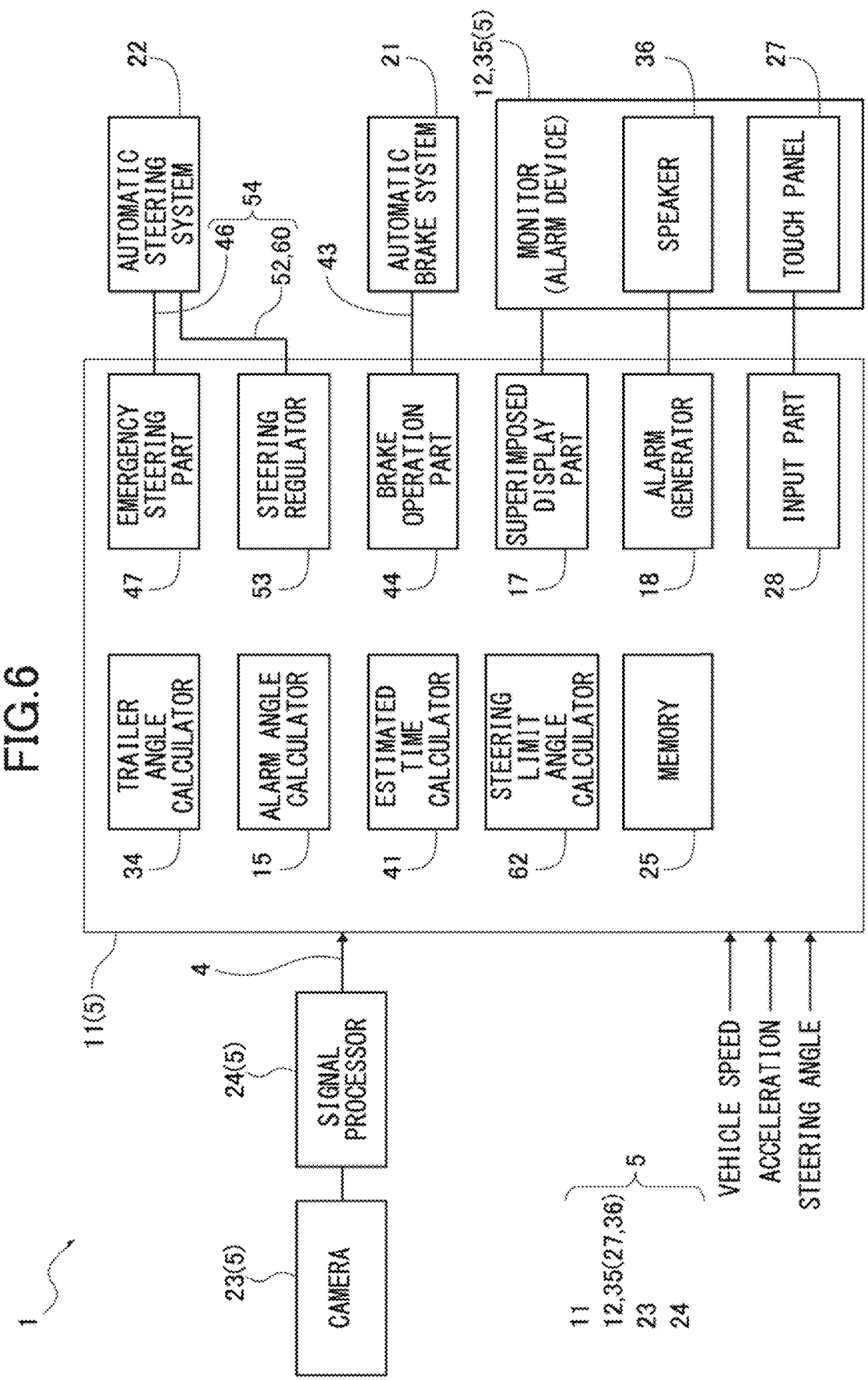
FIG. 6 is a block diagram illustrating a controller of the towing assist device.

The towing assist device 5 includes a controller 11 that assists the reversing of the vehicle 1 to which the trailer 3 is coupled with the coupling tool 2, and a monitor 12 that displays a periphery of the coupling tool 2 attached to the rear portion of the vehicle 1 with a rear view at least when the vehicle 1 reverses (FIG. 5). As illustrated in FIG. 6, the controller 11 includes an alarm angle calculator 15 that calculates an alarm angle 14 (FIG. 7) equal to or smaller than the jackknife angle 13 (FIG. 7) causing the jackknife phenomenon by the vehicle 1 and the trailer 3 in the reversing, and an alarm generator 18 that gives an alarm when the trailer angle 4 between the vehicle 1 and the trailer 3 is equal to or larger than the alarm angle 14.

The trailer 3 is a vehicle to be towed by the vehicle 1. The trailer 3 is a driven type trailer.

The vehicle 1 is a towing vehicle that tows the trailer 3. The vehicle 1 is a self-propelled vehicle capable of advancing and reversing, for example. The vehicle 1 can turn or change a direction by the steering in the right and left direction. The vehicle 1 may be driven by a passenger, and may include a driving assist operation that assists the driving by a passenger or an automatic driving operation that automatically drives instead of a passenger (driving assist vehicle or autonomous driving vehicle). The vehicle 1 such as a driving assist vehicle or an autonomous driving vehicle is equipped with at least one of an automatic brake system 21 and an automatic steering system 22 (FIG. 6). The automatic brake system 21 and/or the automatic steering system 22 are/is mounted on the vehicle 1 to be a part of the vehicle 1 such as a driving assist vehicle or an autonomous driving vehicle.

The controller 11 is constituted by an arithmetic controller such as a computer mounted on the vehicle 1 and a control software installed in the computer to calculate various control amounts required for assisting the towing of the trailer 3. An image acquisition part such as a camera 23 that acquires an image of the periphery of the coupling tool 2 is directly or through a signal processor 24 connected to the controller 11. The information from the camera 23 and the signal processor 24 is sent to an after-described superimposed display part 17 to be displayed on the monitor 12. The monitor 12 displays an image and/or a figure of the periphery of the coupling tool 2 by using the information from the camera 23 and the signal processor 24. The camera 23 and the signal processor 24 are provided in the vehicle 1 as parts of the towing assist device 5. The towing assist device 5 can use the information from the camera 23 and the signal processor 24 to check the coupling of the vehicle 1 and the trailer 3 with the coupling tool 2. The coupling of the vehicle 1 and the trailer 3 can be checked by a radar sensor such as LiDAR or a peripheral situation detector such as a millimeter wave sensor, for example, Milliwave. The camera 23 and peripheral situation detectors (for example, back monitor camera 23a and back sensor 23b in FIG. 8) are mounted on the rear portion of the vehicle 1. The signal processor 24 processes the signal from the camera 23 to send the processed signal to the controller 11. The signal processor 24 may be provided outside or inside the controller 11 as an external device or a software.

The controller 11 includes a memory 25 (FIG. 6) that records various information and data on the towing assist device 5. The memory 25 may be provided inside or outside the controller 11 as an internal memory or an external memory.

The coupling tool 2 is a jig for coupling the trailer 3 to the vehicle 1. The trailer 3 is coupled to the vehicle 1 to be rotatable right and left about a coupling point 26 (FIG. 3) provided in the coupling tool 2. In this embodiment, the coupling point 26 of the coupling tool 2 is a coupling part of the vehicle 1 and the trailer 3.

"Periphery of coupling tool 2" is meant to be the coupling tool 2 and a rear of the vehicle 1 mainly including a front portion of the trailer 3 coupled to the coupling tool 2.

The rear view is a substantial horizontal view (or slightly upward view or slightly downward view to horizontal view) of a rear scene of the vehicle 1.

The monitor 12 may be a display using a liquid crystal panel or an organic EL panel. It is preferable for the monitor 12 to be disposed in the interior (in particular, front portion of interior) of the vehicle 1. The monitor 12 may be exclusively used for the towing assist device 5, or another electronic equipment (for example, metering device, car navigation system, on-vehicle TV, and drive recorder having monitor) disposed in the vehicle 1 may be used as the monitor 12. When the back monitor camera 23a and/or another camera are/is used for the camera 23, the image (moving image) of the periphery of the coupling tool 2 photographed by the camera can be displayed on the monitor 12. A figure (illustration) illustrating the periphery of the coupling tool 2 can be also displayed on the monitor 12 instead of the image. The monitor 12 includes a touch panel 27 to be used as an input device to the towing assist device 5. In this case, the controller 11 includes an input part 28 with which the signal from the touch panel 27 is input.

Figure 9:
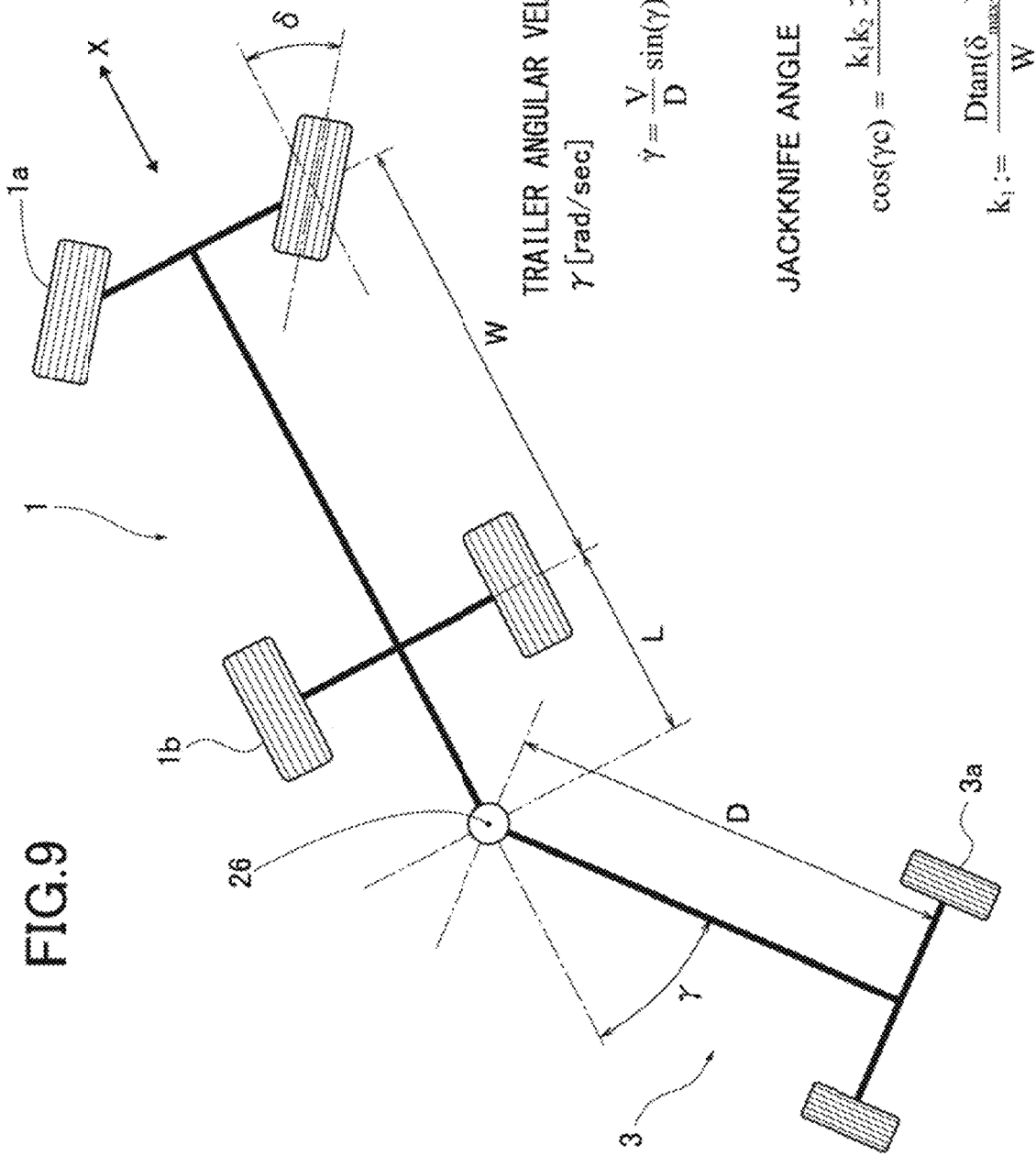
FIG. 9 is a plan view showing parameters of the vehicle and the trailer, which are substituted into a relational expression for calculating the jackknife angle and a trailer angular velocity.
Figure 10A:
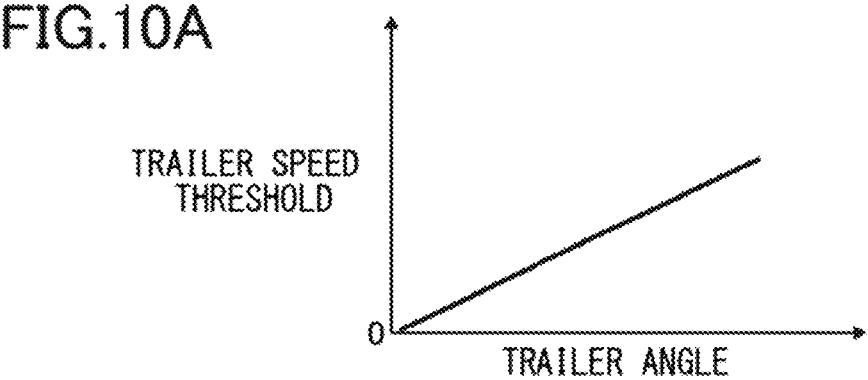
FIG. 10A shows a map for acquiring a trailer speed threshold as a gain.
Figure 10B:
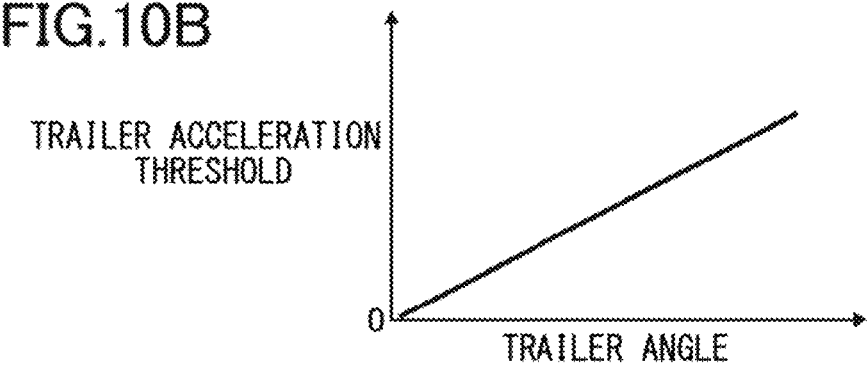
FIG. 10B shows a map for acquiring a trailer acceleration threshold as a gain.
Figure 10C:
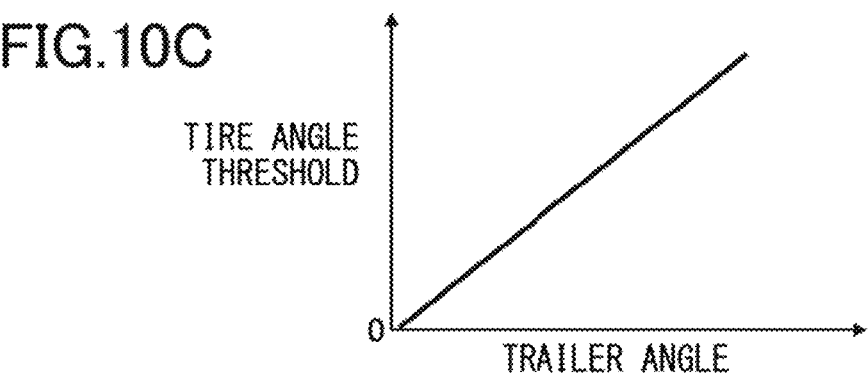
FIG. 10C shows a map for acquiring a tire angle threshold as a gain.
Figure 10D:
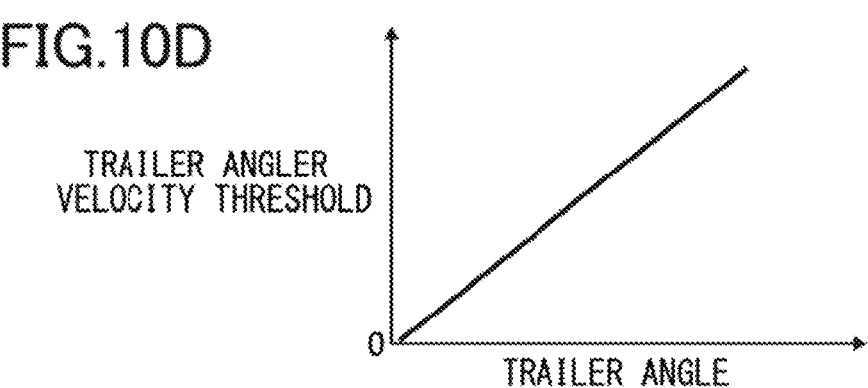
FIG. 10D shows a map for acquiring a trailer angular velocity threshold as a gain.

The jackknife angle 13 is calculated by substituting each parameter (vehicle data) of the vehicle 1 and the trailer 3 as illustrated in FIG. 9, for example, into a linear geometric relational expression (Equation 1). In the relational expression, D denotes a distance from the coupling point 26 of the coupling tool 2 to a coupled driving wheel 3b (center) of the trailer 3, W denotes a distance (wheelbase) between a front wheel 1a (center) and a rear wheel 1b (center) of the vehicle 1, L denotes a distance from the rear wheel 1b (center) of the vehicle 1 to the coupling point 26 of the coupling tool 2, δ denotes a tire angle of the vehicle 1, and γc denotes the jackknife angle 13.

In this embodiment, the front wheel 1a of the vehicle 1 is a steering wheel. The parameters such as D, W, and L can be stored in the memory 25 through the input part 28. The jackknife angle 13 has a specific value (fixed value) for the vehicle 1 and the trailer 3, and has the same angle on both sides in the vehicle longitudinal direction X to be bilateral symmetry. The previously calculated jackknife angle 13 may be input to the controller 11 through the touch panel 27 to be stored in the memory 25, so that the jackknife angle 13 may be always used in the controller 11. The jackknife angle 13 calculated inside the controller 11 may be directly used or may be stored in the memory 25 to be used. The controller 11 may include a jackknife angle calculator dedicated to calculate the jackknife angle. For example, the alarm angle calculator 15 may be used as the jackknife angle calculator. The jackknife angle 13 may be calculated by the dedicated jackknife angle calculator and/or the alarm angle calculator 15.

The alarm angle 14 is a threshold angle for giving an alarm. The alarm angle 14 may be set to the same angle as the jackknife angle 13. However, it is preferable for the alarm angle 14 to be set to an angle smaller than the jackknife angle 13 for giving an alarm in an early stage. However, if the alarm angle 14 is too small, the alarm is given frequently, which is not a practical situation. It is therefore preferable for the alarm angle 14 to be set to a practically most suitable angle. The alarm angle 14 may be a fixed value. However, it is preferable for the alarm angle 14 to be a variable with time according to the situation of the vehicle 1 and the trailer 3, so as to optimize the alarm angle 14. In a normal case, it is preferable for the alarm angle 14 to be set to the same angle on both sides in the vehicle longitudinal direction X to be bilateral symmetry with the vehicle longitudinal direction X as 0 degree. The alarm angle 14 will be described later.

The alarm angle calculator 15 is an operation part of the controller 11 that calculates the alarm angle 14. The alarm angle calculator 15 successively calculates the most suitable alarm angle 14 that varies with time according to the situation of the vehicle 1 and the trailer 3.

The trailer angle 4 is a swing angle of the vehicle 1 and the trailer 3 (FIGS. 3, 9), and also is an angle between a width center line of the vehicle 1 and a width center line of the trailer 3, which pass through the coupling point 26 of the coupling tool 2. The trailer angle 4 is a variable with time, and is calculated by the controller 11. The controller 11 includes a trailer angle calculator 34 that calculates the trailer angle 4. The trailer angle calculator 34 calculates the trailer angle 4 through an image recognition process and/or a data analysis process on the information from the camera 23, for example.

For example, the trailer angle 4 may be calculated by integrating a trailer angular velocity with an elapsed time. In this case, the trailer angular velocity can be calculated by substituting the above parameters D, W, L, the vehicle speed V, and the tire angle δ into the relational expression (Equation 2 in FIG. 9). The vehicle speed V and the tire angle δ are variables with time. As the trailer angle 4 (actual trailer angle 4) acquired through the image recognition process and/or the data analysis process on the information from the camera 23 and the trailer angle 4 (calculated trailer angle 4) calculated from the trailer angular velocity are basically the same value, both methods are interchangeable for the trailer angle calculator 34 to acquire the trailer angle 4. The trailer angle calculator 34 may be used as the above-described jackknife angle calculator. The above-described jackknife angle 13 may be calculated by the trailer angle calculator 34 as the jackknife angle calculator.

The alarm generator 18 is an operation part of the controller 11 by which an alarm device 35 mounted on the vehicle 1 gives an alarm. For example, an operation of an electronic equipment (for example, car navigation system, on-vehicle camera, and car audio system) mounted on the monitor 12 and/or the vehicle 1 can be used for the alarm device 35. The alarm can be given by sound and/or display. The alarm by the sound may be given from a speaker 36 and/or a buzzer provided in the electronic equipment mounted on the monitor 12 and/or the vehicle 1. The alarm by the display may be given by the monitor 12, for example. The alarm by the display of the monitor 12 can be given by appropriately combining color variation and display such as an alert character and an alert figure. In this embodiment, when the trailer angle 4 is equal to or larger than the alarm angle 14, the sound alarm is given. When the trailer angle 4 is equal to or larger than the jackknife angle 13, the screen of the monitor 12 and/or the fan-shaped inside area 16 displayed in blue on the monitor 12 may be changed to an alert color such as yellow. However, the alarm by the display is not limited to the above, and the alert color is not limited to yellow. The alarm angle calculator 15 may include the operation of the alarm generator 18.

The controller 11 may include the superimposed display part 17 that superimposes at least a part of the inside area 16 inside the alarm angles 14 onto the position of the coupling tool 2 to be displayed on the monitor 12 (FIG. 5).

Figure 7:
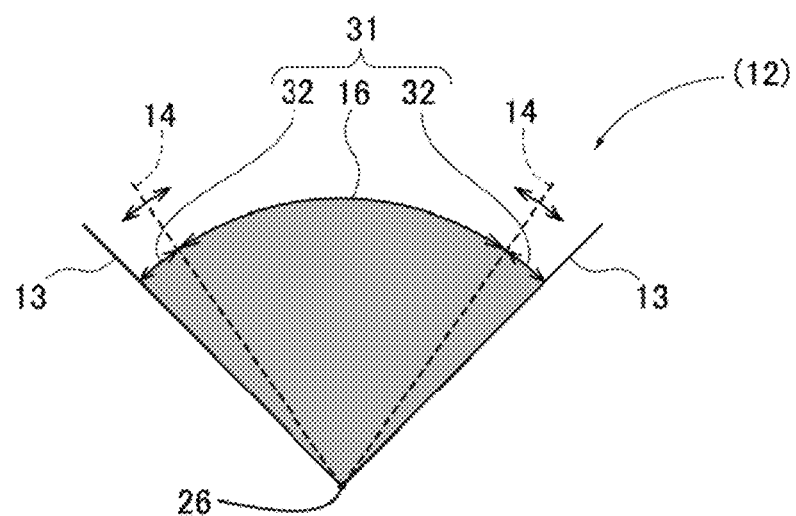
FIG. 7 is a drawing illustrating a relationship among a jackknife angle, a steering range without the jackknife angle, and an alarm angle.
Figure 8:
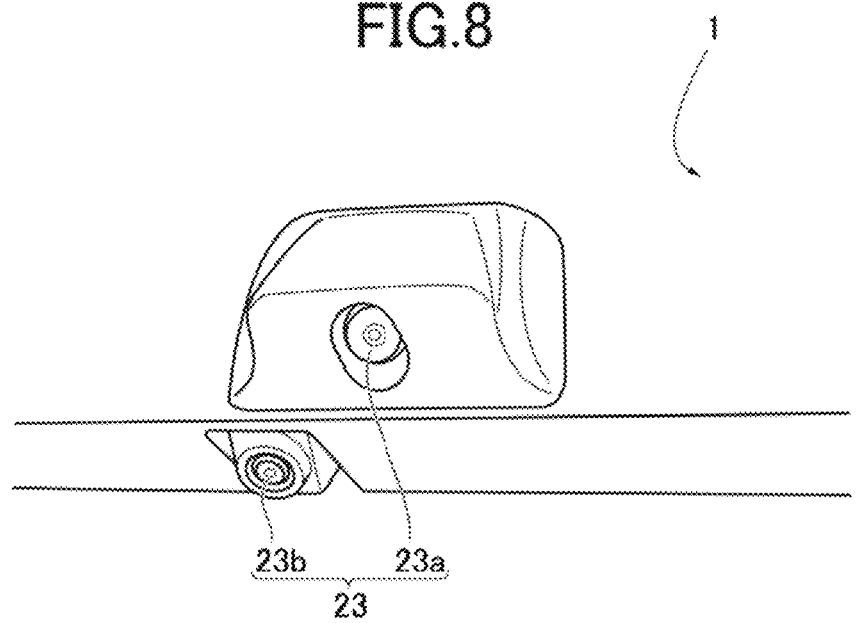
FIG. 8 is a perspective view of a rear portion of the vehicle illustrating an angle detector.

The inside area 16 (FIG. 7) is a fan-shaped range defined by the right and left two alarm angles 14 set between the right and left two jackknife angles 13. The superimposed display part 17 displays the inside area 16 on the monitor 12 based on the alarm angle 14 from the alarm angle calculator 15. The area defined by the right and left two jackknife angles 13 is the jackknife phenomenon free steering allowable area 31 (FIG. 7). The area defined by the angles outside the right and left two jackknife angles 13 is a jackknife phenomenon area. The inside area 16 within the steering allowable area 31 and defined by the right and left two alarm angles 14 is a safe area, which allows the steering without causing the jackknife phenomenon, or an alarm free area. The area between the jackknife angle 13 and the alarm angle 14, which is outside the inside area 16 inside the steering allowable area 31 is a jackknife phenomenon alert area 32 (FIG. 7) or an alarm area which gives an alarm. In FIG. 7, the jackknife phenomenon occurs in the area outside the steering allowable area 31 while no jackknife phenomenon occurs in the area outside the inside area 16 as long as the area does not exceed the alert area 32. Accordingly, it is advantageous to assist the reversing of the vehicle 1 within the inside area 16, not the steering allowable area 31.

The fan-shaped inside area 16 can be clearly displayed on the monitor 12 by coloring at least a part of the inside area 16 in blue, for example. It can be thereby visually recognized that the trailer angle 4 (or coupling tool 2) falls within the blue inside area 16 through the monitor 12, and the vehicle 1 can be easily reversed to fall within the inside area 16. Thus, the jackknife phenomenon can be easily prevented by appropriately reversing the vehicle 1. The color of the inside area 16 is not limited to blue. When the alarm angle 14 calculated according to the situation of the vehicle 1 and the trailer 3 is used, the size of the inside area 16 is changed with time.

At least a part of the inside area 16 is meant to be the entire inside area 16 or a part of the inside area 16. As the inside area 16 is the safe area, the purpose of assisting the reversing of the vehicle 1 can be achieved as long as the trailer angle 4 falls within a part of the inside area 16 even though only a part of the inside area 16 is displayed. The display of the inside area 16 on the monitor 12 can be maximally expanded to the steering allowable area 31 defined by the right and left jackknife angles 13.

The superimposed display part 17 is an operation part of the controller 11 that simultaneously displays the image or the figure of the periphery of the coupling tool 2 and at least a part of the fan-shaped inside area 16. The superimposed display part 17 may display another image on the monitor 12, but may simplify the display for improving the visibility by displaying only the image or the figure of the periphery of the coupling tool 2 and at least a part of the fan-shaped inside area 16. In this embodiment, the superimposed display part 17 may display, in addition to the above, the lines showing an after-described target trailer angle 65 and an after-described steering limit angle 61 according to needs.

The alarm angle calculator 15 regularly updates the alarm angle 14 by using at least one of the vehicle speed, the acceleration, the steering angle, and the trailer angular velocity based on the jackknife angle 13. The superimposed display part 17 may successively display at least a part of the inside area 16 defined by the updated alarm angles 14 on the monitor 12.

In this case, the vehicle speed is a speed of the vehicle 1 and the trailer 3. The vehicle speed can be acquired from a speed sensor provided in the vehicle 1 and the trailer 3.

The acceleration is a speed variation due to vibration or impact on the vehicle 1 and the trailer 3. The acceleration can be acquired from an acceleration sensor provided in the vehicle 1 and the trailer 3.

The steering angle is a turning angle of a steering wheel of the vehicle 1. The steering angle can be acquired from a steering sensor provided in the vehicle 1. In this embodiment, the tire angle is substantially similar to the steering angle.

The trailer angular velocity is a speed of the rotation of the trailer 3 about the coupling point 26 of the coupling tool 2. The trailer angular velocity is calculated by the trailer angle calculator 34 as described above. The vehicle speed, the acceleration, the steering angle, and the trailer angular velocity are a variable physical quantity with time.

The alarm angle 14 can be acquired by multiplying the jackknife angle 13 with a gain acquired from the vehicle speed, the acceleration, the steering angle, and the trailer angular velocity, for example.

Alarm Angle 14=Jackknife Angle 13×Gain

The gain is set to a value smaller than one. The gain can be calculated with a formula such as "Map Value/Actual Value". In this formula, the gain (and alarm angle 14) decreases in accordance with an increase in the denominator (actual value), and the gain (and alarm angle 14) increases in accordance with an increase in the numerator (map value).

More specifically, the formula for calculating the gain is at least one of the following formulas.

"Map Value of Vehicle Speed/Value of Actual Vehicle Speed"

"Map Value of Acceleration/Value of Actual Acceleration"

"Map Value of Steering Angle/Value of Actual Steering Angle"

"Map Value of Trailer Angular Velocity/Value of Actual Trailer Angular Velocity"

As illustrated in FIGS. 10A to 10D, for example, the map is set to, for example, a linear function which increases proportionally with the horizontal axis as the present trailer angle 4 and the vertical axis as the threshold of the above-described variable physical quantity. The map value is acquired by mapping. The map value is acquired as a value of a function (various thresholds, for example, trailer speed threshold, trailer acceleration threshold, tire angle threshold, and trailer angular velocity threshold) in the present trailer angle 4. The gain acquired from each physical quantity is multiplied by each other to be one gain, for example. For example, when the jackknife angle 13 is 30 degrees and the gain is 0.83 . . . , the alarm angle 14 is 25 degrees (=30×0.83 . . . ).

The basic configuration of the above described towing assist device 5 is mainly used for the vehicle 1 driven by a passenger, and may be also used for a driving assist vehicle and an autonomous driving vehicle.

An additional operation of the towing assist device 5 will be described.

The controller 11 may include an estimated time calculator 41 that calculates an estimated time until the trailer angle 4 equals the jackknife angle 13 by using the trailer angular velocity.

The estimated time is an estimated value of a time (allowance time or extension time) until the trailer angle 4 equals the jackknife angle 13. As the trailer angle 4 is calculated by integrating the trailer angular velocity with a certain elapsed time assuming that a certain vehicle speed and a certain tire angle are maintained, the estimated time can be acquired by calculating the elapsed time until the trailer angle 4 equals the jackknife angle 13. However, as the vehicle speed and the tire angle vary with time according to the situation of the vehicle 1 and the trailer 3, the estimated time varies with time. The trailer angular velocity may be individually calculated by the estimated time calculator 41, or the trailer angular velocity used for calculating the trailer angle 4 by the alarm angle calculator 15 may be used. The estimated time calculated as described above is sent to the alarm generator 18 by which the alarm device 35 gives an alarm when the estimated time is equal to or smaller than a predetermined time. In this case, the predetermined time can be most suitably set based on a reaction time required for a brake operation by a passenger. The estimated time may be used as described below.

The estimated time calculator 41 is an operation part of the controller 11 that calculates the estimated time until the trailer angle 4 equals the jackknife angle 13.

The estimated time calculator 41 is additionally provided in the towing assist device 5 of the above described basic configuration. However, when it is only necessary to monitor whether the estimated time is equal to or smaller than the predetermined time without monitoring whether the trailer angle 4 is equal to or larger than the alarm angle 14, the controller 11 may include at least one of the alarm generator 18 that gives an alarm when the estimated time is equal to or smaller than the predetermined time and after-described parts on FIG. 16 in addition to the estimated time calculator 41 and the superimposed display part 17 that superimposes at least a part of the steering allowable area 31 (inside jackknife angles 13) onto the position of the coupling tool 2 to be displayed on the monitor 12 (FIG. 5). More particular, for example, the controller 11 includes the estimated time calculator 41, the superimposed display part 17, and the alarm generator 18.

The controller 11 may include a brake operation part 44 that sends a brake operation signal 43 (FIG. 6) for emergently stopping the vehicle 1 to the automatic brake system 21 mounted on the vehicle 1.

A first set time is set to the brake operation part 44 as a most suitable time required for emergently stopping the vehicle 1 by the automatic brake system 21. The first set time can be individually set according to the performance of the automatic brake system 21 mounted on the vehicle 1 (driving assist vehicle or autonomous driving vehicle) and the vehicle 1. The first set time may be set to 0.8 seconds, for example, but the first set time is not limited thereto.

The automatic brake system 21 automatically controls the operation of a brake mounted on the vehicle 1 such as a driving assist vehicle or an autonomous driving vehicle.

The brake operation signal 43 is an emergency brake signal by which the automatic brake system 21 performs a brake operation for emergency stop.

The brake operation part 44 is an operation part of the controller 11 that sends the brake operation signal 43 for operating the brake to the automatic brake system 21 (when estimated time is equal to or smaller than first set time) through the communication with the automatic brake system 21 of the vehicle 1. When the automatic brake system 21 receives the brake operation signal 43, the automatic brake system 21 operates the brake to emergently stop the vehicle 1 with the acceleration of 1G, for example.

The controller 11 may include an emergency steering part 47 that sends an emergency steering signal 46 by which the vehicle 1 emergently steers in a direction in which the trailer angle 4 decreases to the automatic steering system 22 mounted on the vehicle 1 when the estimated time calculated by the estimated time calculator 41 is equal to or smaller than a second set time shorter than the first set time.

The second set time is set to the emergency steering part 47 as the most suitable time required for the vehicle 1 to emergently steer by the automatic steering system 22. The second set time can be individually set according to the performance of the automatic steering system 22 mounted on the vehicle 1 (driving assist vehicle or autonomous driving vehicle). The second set time may be set to 0.6 seconds, for example, but the second set time is not limited thereto.

The automatic steering system 22 is mounted on the vehicle 1 such as a driving assist vehicle or an autonomous driving vehicle to automatically control the steering.

The emergency steering signal 46 is a steering signal 54 by which the automatic steering system 22 performs the emergency steering.

The emergency steering part 47 is an operation part of the controller 11 that sends the emergency steering signal 46 for the emergency steering (when estimated time is equal to or smaller than second set time) to the automatic steering system 22 through the communication with the automatic steering system 22 of the vehicle 1. When the automatic steering system 22 receives the emergency steering signal 46, the automatic steering system 22 performs the steering until the tire angle reaches 0 degree with the maximum torque, for example. The emergency steering part 47 assists the brake operation part 44.

The above configuration is used for the vehicle 1 (for example, driving assist vehicle or autonomous driving vehicle) that can steer to the maximum steering angle exceeding the jackknife angle 13 (no limit on steering angle).

Another operation of the towing assist device 5 will be described.

The controller 11 may include a steering regulator 53 (FIG. 6) that sends a steerable area regulation signal 52 (first steerable area regulation signal 52) for regulating a steerable area 51 of the vehicle 1 within the inside area 16 defined by the alarm angles 14 (FIG. 11) to the automatic steering system 22 mounted on the vehicle 1.

The steerable area 51 is an area capable of being steered. In a normal case, the steerable area 51 is within the range of the right and left maximum steering angles of the vehicle 1. In this embodiment, the steerable area 51 is set to a range narrower than the right and left maximum steering angles of the vehicle 1 by limiting the steerable area 51. The steerable area 51 varies with time according to the situation of the vehicle 1 and the trailer 3. In this embodiment, the steering angle is automatically regulated such that the steerable area 51 falls within the same range as the inside area 16 of the alarm angles 14 or is a range narrower than that. The steering or the automatic steering can be thereby performed without exceeding the alarm angles 14.

Figure 12A:
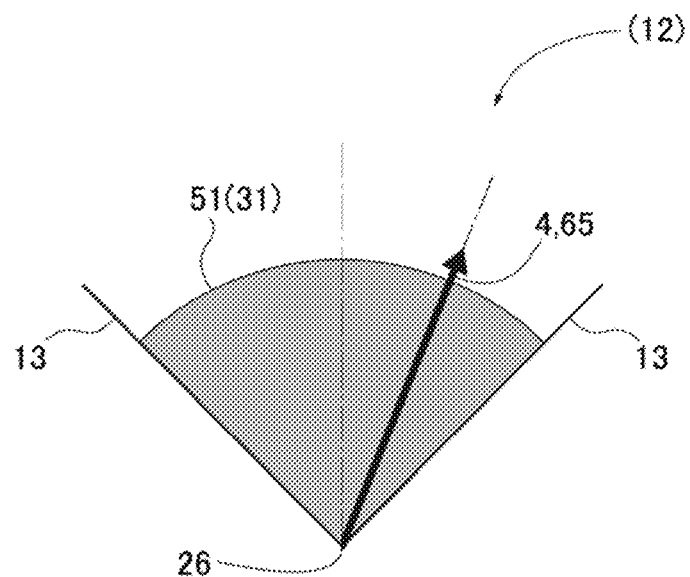
FIG. 12A is a drawing illustrating the steerable area before being narrowed.

The steerable area 51 can be set to regulate the steering angle to the range within the jackknife angles 13 (steering allowable area 31) (for example, FIG. 12A). In this case, for example, the controller 11 may include the steering regulator 53 that sends the steerable area regulation signal 52 for regulating the steerable area 51 of the vehicle 1 within the steering allowable area 31 inside the jackknife angles 13 to the automatic steering system 22 and the superimposed display part 17 that superimposes at least a part of the steering allowable area 31 onto the position of the coupling tool 2 to be displayed on the monitor 12 (FIG. 5).

The steerable area regulation signal 52 is a steering signal 54 by which the automatic steering system 22 performs the steering regulation. The steerable area regulation signal 52 is sent to the automatic steering system 22 while the vehicle 1 reverses.

The steering regulator 53 is an operation part of the controller 11 by which the automatic steering system 22 performs the automatic steering regulated within the inside area 16 (within steering allowable area 31) of the alarm angles 14 through the communication with the automatic steering system 22 of the vehicle 1. The steering regulator 53 thereby prevents the vehicle 1 from steering outside the inside area 16 of the alarm angles 14 (or steering allowable area 31) when the vehicle 1 reverses. Accordingly, it is not always necessary for the controller 11 to include the operations of the brake operation part 44 and the emergency steering part 47, but it is possible to combine the operation of the brake operation part 44 and/or the operation of the emergency steering part 47 with the operation of the steering regulator 53. In addition, the steering regulator 53 and the emergency steering part 47 can be configured as one operation part.

The above configuration is used for the vehicle 1 such as a driving assist vehicle or an autonomous driving vehicle, but can be used for the vehicle 1 driven by a passenger. In this case, for example, the steering angle can be regulated by sending the steerable area regulation signal 52 to a power steering motor of the vehicle 1.

The controller 11 may include a steering limit angle calculator 62 (FIG. 6) that calculates a steering limit angle 61 (FIG. 12B) for avoiding the jackknife phenomenon while the automatic steering system 22 performs the reversing assist of the vehicle 1. The superimposed display part 17 narrows the steerable area 51 close to the steering limit angle 61 and displays the narrowed steerable area 51 on the monitor 12. The steering limit angle calculator 62 may send a steerable area regulation signal 60 (FIG. 6) for regulating the steerable area 51 of the vehicle 1 within a limit area 63 narrowed by the steering limit angle 61 to the automatic steering system 22 from the steering regulator 53.

The reversing assist of the vehicle 1 is an operation for assisting the reversing of the vehicle 1 that tows the trailer 3, and is provided in the automatic steering system 22 of the vehicle 1 such as a driving assist vehicle or an autonomous driving vehicle and/or the reversing assist system provided in the vehicle 1 driven by a passenger. The reversing assist system is provided in the vehicle 1 as the operation for assisting the reversing of a towing vehicle. The reversing assist system controls the steering in reversing by sending a control signal to a power steering motor of the vehicle 1. Hereinafter, the description is made by assuming that the automatic steering system 22 includes the reversing assist system. In the reversing assist to the vehicle 1 (towing vehicle), a so-called increase operation 64 (FIG. 13B) is performed. The information on the increase operation 64 can be sent to the controller 11 from the automatic steering system 22 and/or the reversing assist system through the communication, for example.

Figure 13A:
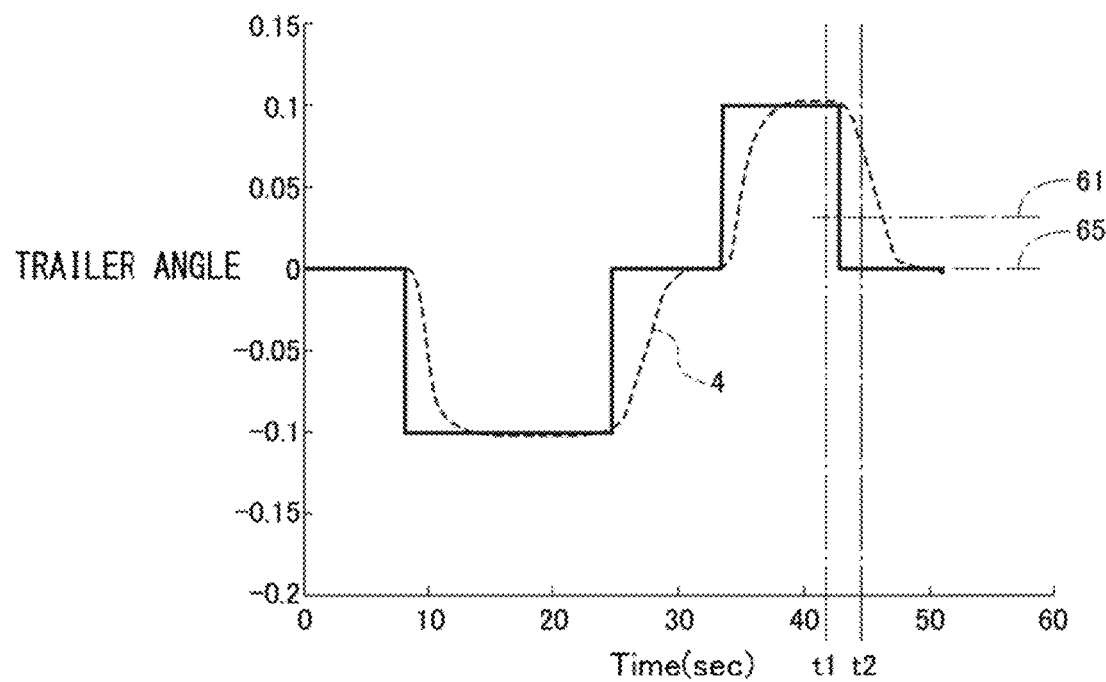
FIG. 13A is a graph showing a change in the trailer angle with time.
Figure 13B:
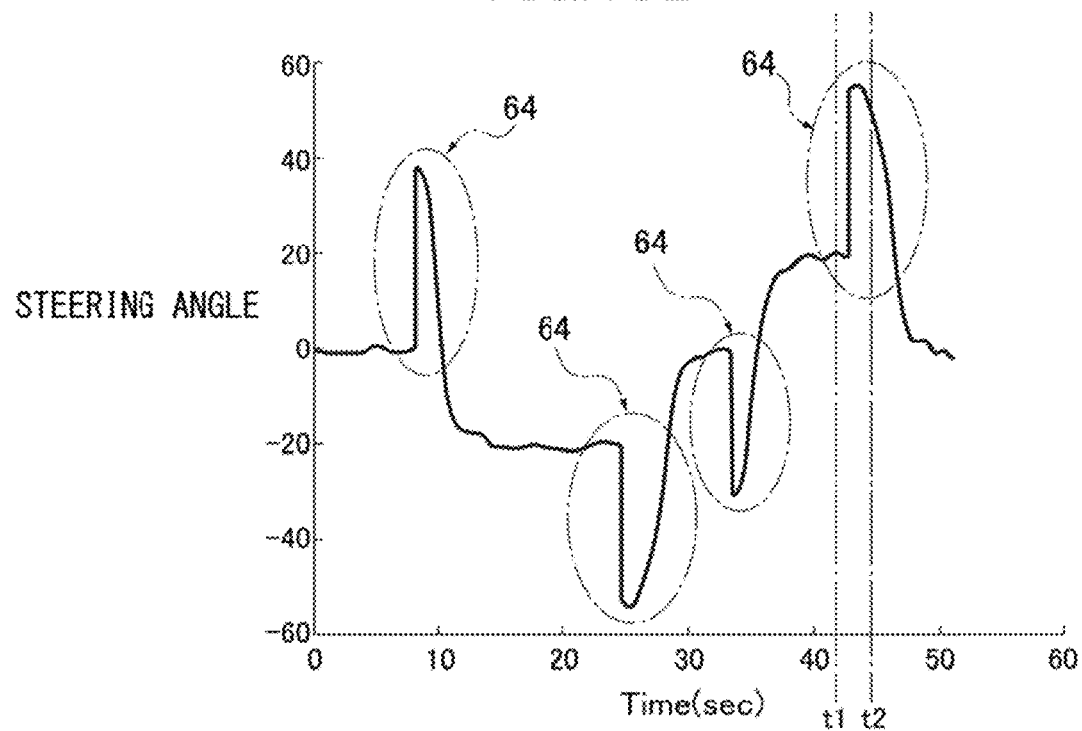
FIG. 13B is a graph showing a change in the steering angle with time.

More specifically, in the reversing assist by the automatic steering system 22 and/or the reversing assist system, the increase operation 64 is performed as a unique steering operation. In the increase operation 64, for example, as illustrated in FIG. 13A, when the trailer angle 4 is changed in the direction opposite to the present direction (or plus/minus of trailer angle 4 is changed), as illustrated in FIG. 13B, the vehicle 1 largely steers in the same direction as the direction before changing the trailer angle 4, and then the vehicle 1 steers in the opposite direction by the steered amount in the direction before changing the trailer angle 4. The solid line in FIG. 13A shows the trailer angle 4 controlled by the controller 11, and the dashed line in FIG. 13A shows the actually changed trailer angle 4. FIG. 13B shows a change in the steering angle for changing the trailer angle 4 as illustrated in FIG. 13A. Such an increase operation 64 is relatively frequently performed.

In the increase operation 64, the entire steering amount is increased and the steering direction is largely changed, so that the trailer 3 is greatly swung, which may cause the jackknife phenomenon. The steering amount in the increase operation 64 differs depending on an angle (target trailer angle 65 (FIG. 13A)) that changes the trailer angle 4. In addition, the target trailer angle 65 that changes the trailer angle 4 varies with time according to the situation of the vehicle 1 and the trailer 3. The target trailer angle 65 may be automatically set by the automatic steering system 22 or the reversing assist system to be sent to the controller 11, or may be directly input to the input part 28 of the controller 11 with the touch panel 27 by a passenger.

The steering limit angle 61 is an angle of the trailer 3 (limited target trailer angle) set between the present trailer angle 4 and the target trailer angle 65 for limiting the large change in the trailer angle 4 toward the target trailer angle 65. The automatic steering system 22 and the reversing assist system control the steering to gradually approach the target trailer angle 65 while targeting the steering limit angle 61, not the target trailer angle 65. In this case, the steering limit angle 61 varies with time to approach the target trailer angle 65.

Figure 12B:
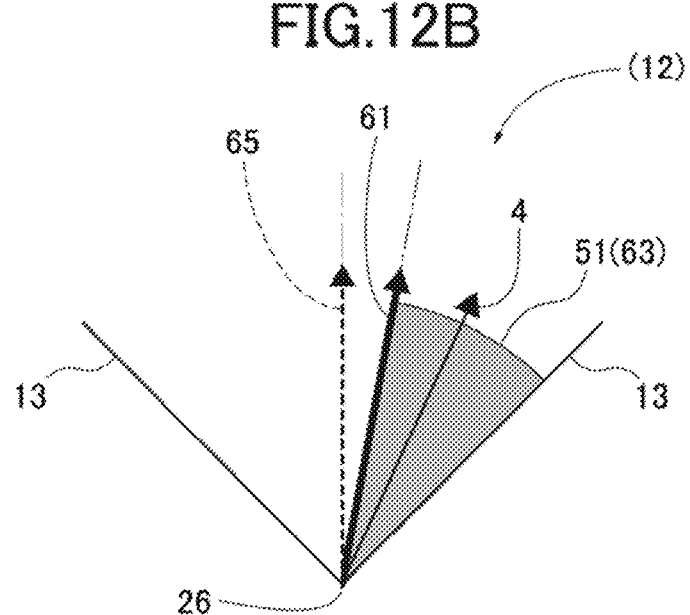
FIG. 12B is a drawing illustrating the steerable area narrowed close to a steering limit angle.

By setting the steering limit angle 61, the steering is limited by the steering limit angle 61. Accordingly, as illustrated in FIG. 12A, the steerable area 51 (inside area 16 or steering allowable area 31) by the automatic steering system 22 is narrowed to the range (limit area 63 or steerable limit area) by the steering limit angle 61 as illustrated in FIG. 12B. By controlling the steerable area 51 (part of target trailer angle 65) by the steering limit angle 61, the right-left symmetric steerable area 51 as illustrated in FIG. 12A is changed to the right-left asymmetric limit area 63 as illustrated in FIG. 12B. The limit area 63 may be set to be slightly (for example, about 3 to 5 degrees) wider than the steering limit angle 61 toward the target trailer angle 65. It is preferable for the monitor 12 to display the right-left asymmetric limit area 63, but it may continuously display the steerable area 51 which represents before the steering limitation by the steering limit angle 61.

Figure 14A:
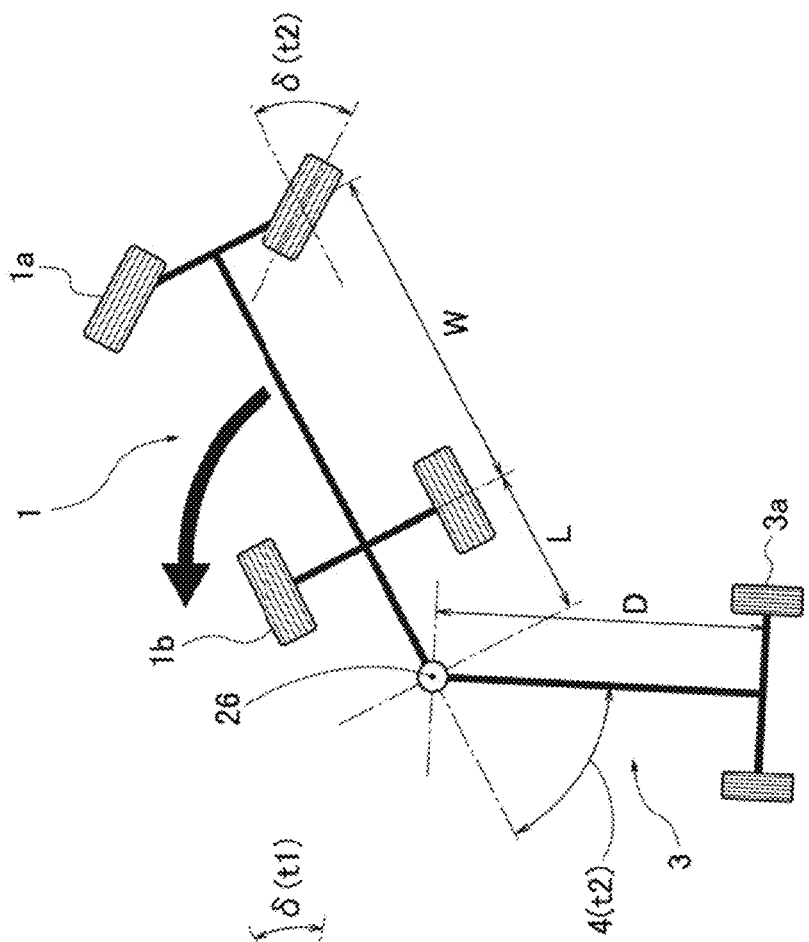
FIG. 14A is a drawing illustrating the steering before an increase operation (time t1).
Figure 14B:
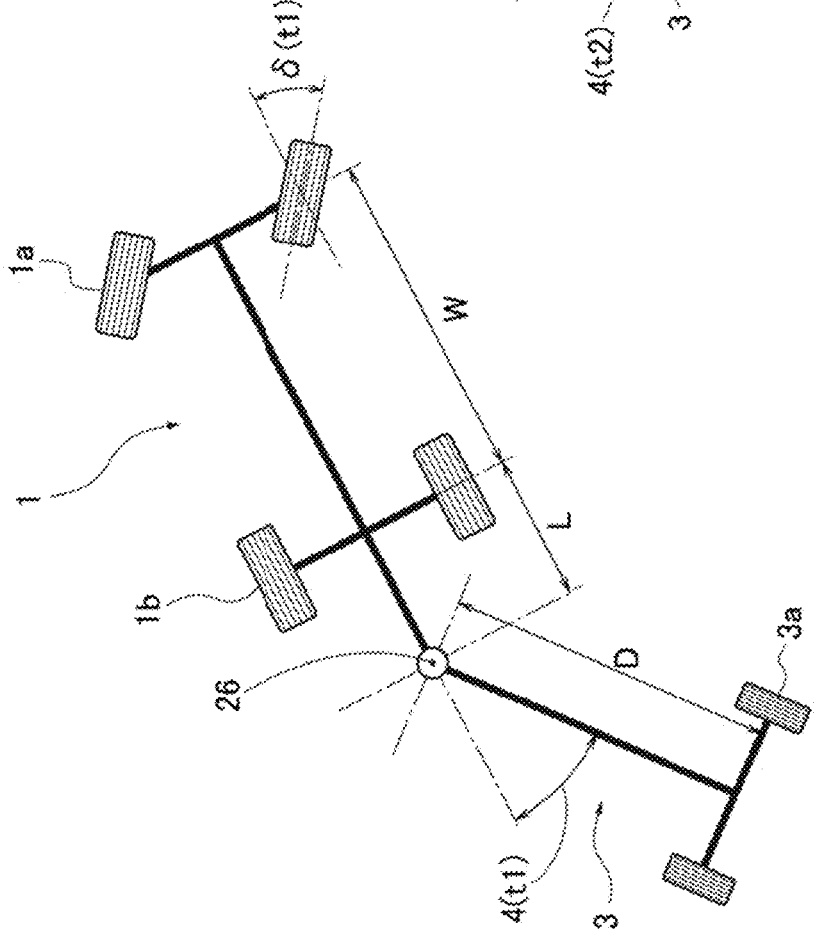
FIG. 14B is a drawing illustrating the steering during the increase operation (time t2).

FIGS. 12A, 14A correspond to a time t1 (just before increase operation 64) in the final increase operation in FIG. 13A or FIG. 13B. FIG. 12B, 14B correspond to a time t2 (in the middle of increase operation 64) in the final increase operation in FIG. 13A or FIG. 13B. In the final increase operation 64, at the time t1, the target trailer angle 65 coincides with the trailer angle 4 at that point, while at the time t2, the target trailer angle 65 is 0 degree and the steering limit angle 61 is a value larger than 0 degree and between the target trailer angle 65 and the trailer angle 4. The tire angle is largely steered in the direction opposite to the target trailer angle 65 at the time t2 with respect to the time t1 (δ(t1)→δ(t2)).

The specific steering limit angle 61 may be set in any way.

The steering limit angle 61 can be calculated with the following equation, for example.

Steering Limit Angle 61=(Jackknife Angle 13−Present Trailer Angle 4)−Target Trailer Angle 65

By calculating the steering limit angle 61 with such an equation, the steering limit angle 61 can be controlled to the steering amount smaller than the target trailer angle 65. The steering limit angle 61 can be displayed on the monitor 12 by a red line, for example, together with the display of the narrowed limit area 63 and the periphery of the coupling tool 2. However, the line illustrating the steering limit angle 61 is not limited to the red line. The target trailer angle 65 may be displayed or may not be displayed. In this embodiment, the target trailer angle 65 is not displayed unless otherwise required.

The steering limit angle calculator 62 is an operation part of the controller 11 that limits the steerable area 51 of the vehicle 1 within the limit area 63 narrowed by the steering limit angle 61 by sending the calculated steering limit angle 61 to the steering regulator 53. The steering regulator 53 is an operation part of the controller 11 that sends the steerable area regulation signal 60 for performing the automatic steering limited within the narrowed limit area 63 to the automatic steering system 22 through the communication with the automatic steering system 22 of the vehicle 1.

With the steering limit angle calculator 62 and the steering regulator 53, the vehicle 1 can reverse within the limit area 63 (more specifically, the vehicle 1 can reverse with gradual steering without causing the jackknife phenomenon even though the increase operation 64 is performed). In this case, the operations of the brake operation part 44 and the emergency steering part 47 may not be omitted. However, the operations of the brake operation part 44 and the emergency steering part 47 may be combined with the operations of the steering limit angle calculator 62 and the steering regulator 53. In addition, the reversing within the limit area 63 may be performed only during the increase operation 64, but the reversing may be continued during the reversing without limiting to the increase operation 64.

When a passenger sets the target trailer angle 65, the following configuration may be achieved.

Specifically, the towing assist device 5 may include the touch panel 27 with which the target trailer angle 65 in the reversing direction of the trailer 3 can be input, the steering limit angle calculator 62 that calculates the steering limit angle 61 based on the input target trailer angle 65 with the touched position on the touch panel 27 as the input of the target trailer angle 65, and the superimposed display part 17 that displays the calculated steering limit angle 61 on the monitor 12.

In this case, similar to the above, the steering limit angle calculator 62 sends the steerable area regulation signal 60 from the steering regulator 53 to the automatic steering system 22 in order to regulate the steerable area 51 of the vehicle 1 within the limit area 63 narrowed by the steering limit angle 61. The steering regulator 53 communicates with the automatic steering system 22 of the vehicle 1, so that the automatic steering system 22 performs the automatic steering limited within the narrowed limit area 63 based on the steerable area regulation signal 60.

The steering limit angle 61 is calculated to be an angle between the trailer angle 4 and the target trailer angle 65 at that point. The monitor 12 displays the above-described limit area 63 together with the steering limit angle 61.

When the monitor 12 is the touch panel 27, for example, a passenger touches the touch panel 27 with a finger to simply input the target trailer angle 65 as the angle of the line connecting the position on the monitor 12 touched by the finger and the coupling point 26 of the coupling tool 2, the steering limit angle 61 acquired based on the target trailer angle 65 can be sequentially displayed on the monitor 12, and the change in the steering amount and the steering angle can be gradually controlled to avoid the large steering toward the target trailer angle 65.

The above-described configurations can be appropriately combined within an applicable manner.

Hereinafter, the operation of the embodiment will be described.

When the angle between the vehicle 1 and the trailer 3 is a predetermined angle or more (jackknife angle 13) while the vehicle 1 to which the trailer 3 is coupled reverses, the trailer 3 gets stuck due to the jackknife phenomenon. If such a jackknife phenomenon occurs, the vehicle 1 may collide with the stuck trailer 3. It is therefore necessary for the vehicle 1 to reverse while avoiding the jackknife phenomenon.

Accordingly, the towing assist device 5 of this embodiment assists the reversing of the vehicle 1 (towing vehicle) as follows.

Figure 15:
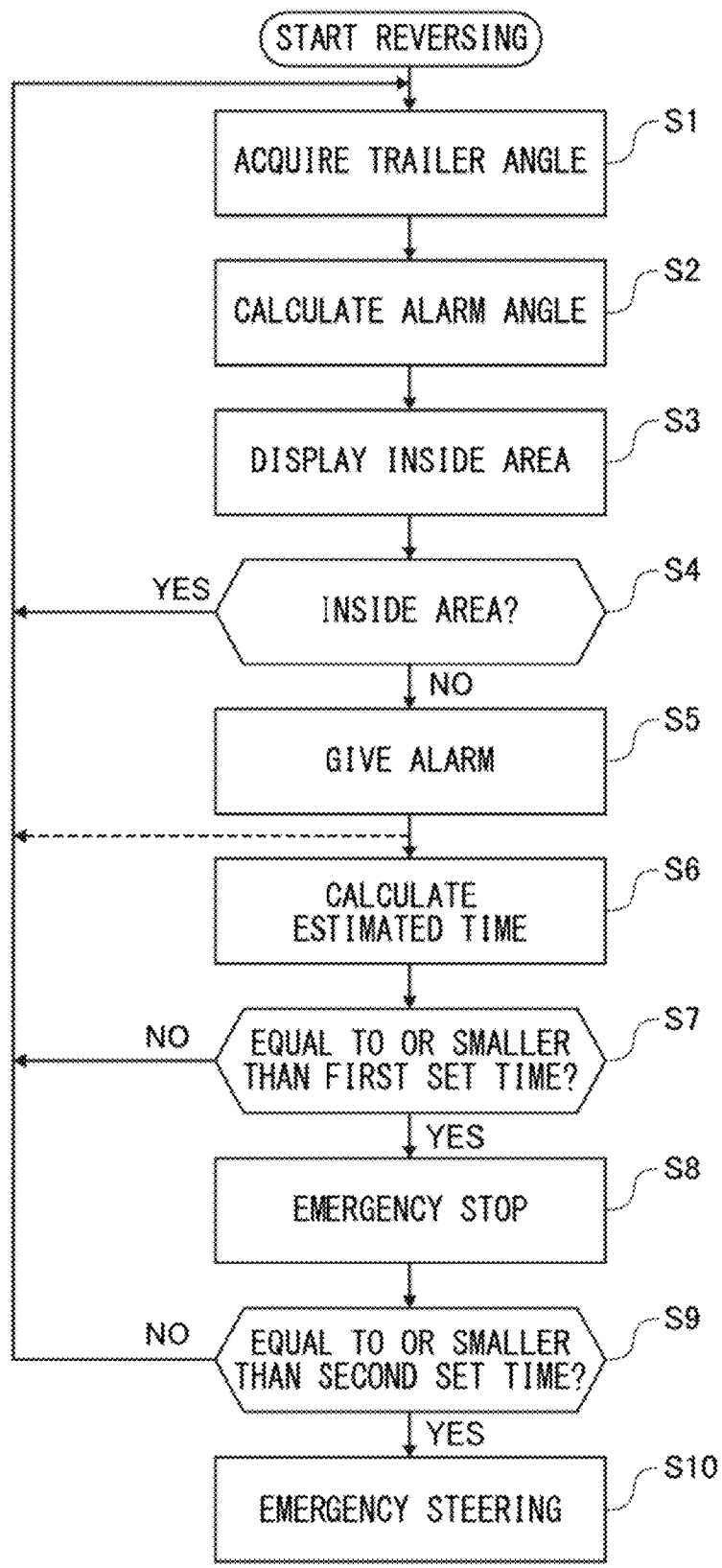
FIG. 15 is a flowchart with no limitation of the steering angle.

FIG. 15 is a flowchart illustrating one example of the control (no regulation on steering angle) by the controller 11 of the towing assist device 5.

As soon as the vehicle 1 starts reversing, the control starts. The trailer angle calculator 34 calculates the trailer angle 4 (acquire trailer angle) in Step S1. The trailer angle 4 is calculated through the image recognition process or the data analysis process on the information from the camera 23, or is calculated by integrating the trailer angular velocity with an elapsed time. The trailer angular velocity is calculated by substituting the parameters (D, W, L) of the vehicle 1 and/or the trailer, the vehicle speed V, and the tire angle δ into the relational expression (Expression 2 in FIG. 9). The trailer angle 4 calculated by the trailer angle calculator 34 is sent to the alarm generator 18 and/or each part of the controller 11 to be used in each part.

Next, in Step S2, the alarm angle calculator 15 calculates the alarm angle 14 by using at least one of the vehicle speed, the acceleration, the steering angle, and the trailer angular velocity based on the jackknife angle 13. The jackknife angle 13 is calculated by substituting each parameter of the vehicle 1 and the trailer 3 into the linear geometric relational expression. The vehicle speed, the acceleration, the steering angle, and the trailer angular velocity are used for acquiring the gain. The alarm angle 14 is calculated by multiplying the jackknife angle 13 with the gain. The alarm angle 14 calculated by the alarm angle calculator 15 is sent to the alarm generator 18, the superimposed display part 17, and each part of the controller 11 to be used in each part.

Next, in Step S3, the superimposed display part 17 displays the actual image of the coupling tool 2 photographed by the camera 23 on the monitor 12, and superimposes the inside area 16 of the alarm angles 14 onto the image and/or the figure of the coupling tool 2 to be displayed.

Next, in Step S4, the alarm generator 18 determines whether or not the trailer angle 4 sent from the trailer angle calculator 34 falls within the inside area 16 of the alarm angles 14 sent from the alarm angle calculator 15. When the trailer angle 4 falls within the inside area 16, the control returns to Step S1 to repeat the above steps. When the trailer angle 4 is outside the inside area 16, the alarm generator 18 gives an alarm in Step S5. A passenger performs a brake operation in response to the alarm. When a passenger drives the vehicle 1, the control returns to Step S1 after requesting the brake operation to the passenger by the alarm in Step S5.

In the case of an autonomous driving vehicle and/or a driving assist vehicle, after Step S5, the estimated time calculator 41 calculates the estimated time until the trailer angle 4 equals the jackknife angle 13 by using the trailer angular velocity. The estimated time can be calculated by acquiring the trailer angle 4 by integrating the trailer angular velocity with a certain elapsed time, and also by calculating the elapsed time until the trailer angle 4 equals the jackknife angle 13.

Next, in Step S7, the brake operation part 44 monitors whether the estimated time calculated by the estimated time calculator 41 is equal to or smaller than the first set time. When the estimated time does not lower the first set time, the control returns to Step S1 to repeat the above steps. When the estimated time is equal to or smaller than the first set time, in Step S8, the brake operation part 44 sends the brake operation signal 43 to the automatic brake system 21 of the vehicle 1 to emergently stop the vehicle 1.

In Step S9, the emergency steering part 47 monitors whether the estimated time calculated by the estimated time calculator 41 is equal to or smaller than the second set time. When the estimated time is not equal to or smaller than the second set time, the control returns to Step S1 to repeat the above steps. When the estimated time is equal to or smaller than the second set time, in Step S10, the emergency steering part 47 sends the emergency steering signal 46 to the automatic steering system 22 of the vehicle 1 to perform the emergency steering of the vehicle 1 to avoid the jackknife phenomenon.

Figure 16:
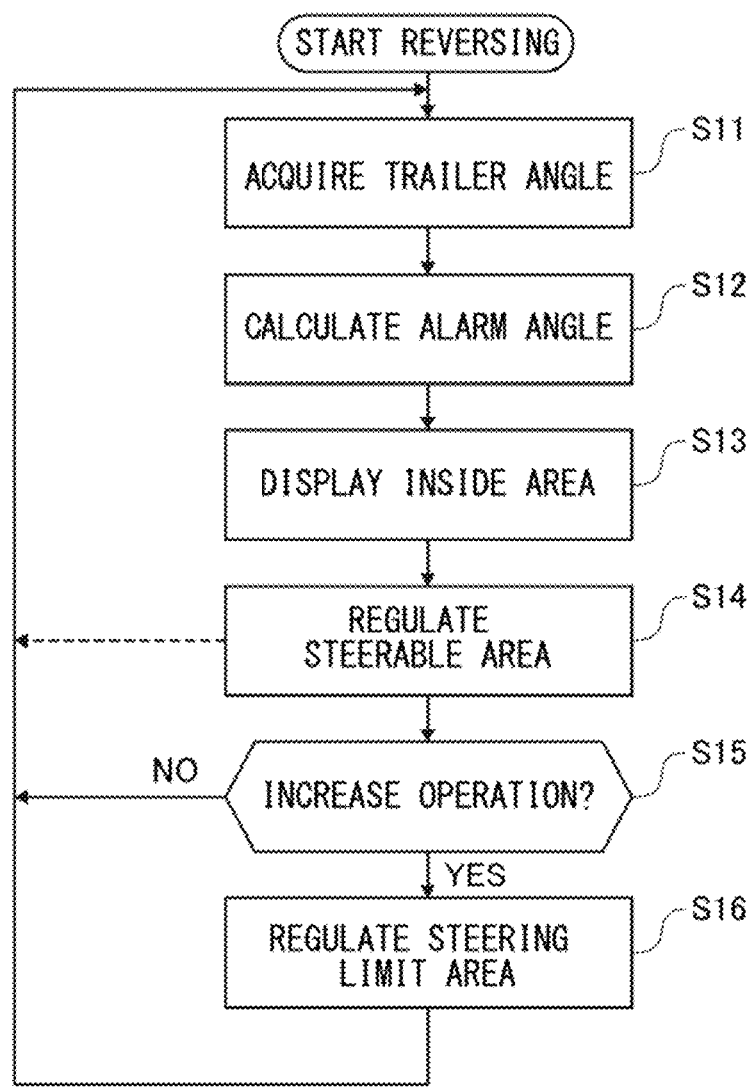
FIG. 16 is a flowchart with the limitation of the steering angle.

The control by the controller 11 when regulating the steering angle to avoid the jackknife phenomenon is as illustrated in FIG. 16, for example. As Steps S11 to S13 in FIG. 16 are substantially similar to Steps S1 to S3 in FIG. 15, the description thereof will be omitted. The controls in FIGS. 15, 16 can be combined by branching the flow based on the necessity of the regulation on the steering angle.

In Step S14, the steering regulator 53 sends the steerable area control signal 52 to the automatic steering system 22 to regulate the steerable area 51 within the inside area 16 (or steering allowable area 31) of the alarm angles 14 calculated by the alarm angle calculator 15, and the control returns to Step S1 to repeat the above steps. The steering angle is thereby regulated when reversing the vehicle 1 to avoid the jackknife phenomenon.

In the case of the vehicle 1 including the automatic steering system 22 having the operation of the reversing assist by the increase operation 64, in Step S15, the controller 11 monitors the necessity of the increase operation 64 through the communication with the automatic steering system 22 or the reversing assist system. When the increase operation 64 is not performed, the control returns to Step S1 to repeat the above steps. When the increase operation 64 is performed, in Step S16, the steering limit angle calculator 62 calculates the steering limit angle 61, and the steering regulator 53 sends the steerable area regulation signal 60 to the automatic steering system 22 of the vehicle 1 to regulate the steering limit angle 61 within the limit area 63 narrowed by the steering limit angle 61. The steering limit angle 61 is appropriately set to a value between the present trailer angle 4 and the target trailer angle 65 by the steering limit angle calculator 62. The vehicle 1 thereby reverses with gradual steering, and the occurrence of the jackknife phenomenon is prevented. In this case, it is most preferable for the display of the monitor 12 to be changed to the limit area 63, but such a change is not always necessary. After that, the control returns to Step S1 to repeat the above steps.

The flowcharts in FIGS. 15, 16 are merely examples, respectively, and the procedures may be slightly changed.

According to the embodiment, the following effects can be obtained.

(Effect 1) The towing assist device 5 includes the controller 11 and the monitor 12. The controller 11 assists the reversing of the vehicle 1 to which the trailer 3 is coupled by the coupling tool 2. A passenger can thereby easily and precisely reverse the vehicle 1 to which the trailer 3 is coupled while monitoring the monitor 12 with the assist of the controller 11.

More specifically, the monitor 12 displays the periphery of the coupling tool 2 attached to the rear portion of the vehicle 1 with a rear view at least when the vehicle 1 reverses. A passenger can thereby monitor the display of the monitor 12 with a view similar to a rear view from a driver's seat, so that a passenger can easily monitor the display of the monitor 12. Thus, a passenger is sufficiently assisted by simply monitoring the monitor 12 of the towing assist device 5.

The controller 11 includes at least the alarm angle calculator 15 and the alarm generator 18. The alarm angle calculator 15 calculates the alarm angle 14 the same as the jackknife angle 13 or smaller than that causing the jackknife phenomenon by the vehicle 1 and the trailer 3. It can be thereby determined whether or not the trailer angle 4 between the vehicle 1 and the trailer 3 falls within the alarm angle 14. The trailer angle 4 within the alarm angle 14 can determine that the jackknife phenomenon is avoided. Accordingly, the jackknife phenomenon can be avoided by reversing the vehicle 1 with the trailer angle 4 which falls within the alarm angle 14.

The alarm generator 18 gives an alarm when the trailer angle 4 is equal to or larger than the alarm angle 14. A passenger can thereby reverse the vehicle 1 safely until the alarm is given. A passenger can also securely stop the vehicle 1 before causing the jackknife phenomenon by the braking operation when the alarm is given, and can avoid the jackknife phenomenon. Accordingly, different from the device described in US2015/0344067A1, which avoids the jackknife phenomenon by indirectly performing the steering operation of the vehicle 1 with the operation such as a control knob, for example, the simplified towing assist device 5 can be achieved.

(Effect 2) The controller 11 may include the superimposed display part 17 that superimposes at least a part of the inside area 16 inside the alarm angles 14 onto the position of the coupling tool 2 to be displayed. A passenger can thereby figure out the relationship between the situation of the coupling tool 2 (situation of actual trailer angle 4) and the inside area 16 of the alarm angles 14. A passenger can figure out whether or not the trailer angle 4 falls within the inside area 16 of the alarm angles 14 through the monitor 12. Thus, a passenger can thereby easily reverse the vehicle 1 while actually confirming whether or not the trailer angle 4 falls within the inside area 16 of the alarm angles 14 by monitoring the display of the monitor 12.

(Effect 3) The alarm angle calculator 15 regularly updates the alarm angle 14 by using at least one of the vehicle speed, the acceleration, the steering angle, and the trailer angular velocity based on the jackknife angle 13. The latest alarm angle 14 can be thereby always acquired, and the various controls can be performed with high accuracy by using the latest alarm angle 14. The superimposed display part 17 sequentially displays at least a part of the inside area 16 based on the updated alarm angles 14 on the monitor 12. The display of the monitor 12 can be thereby always updated to the latest display, and a passenger can thus acquire the latest information from the monitor 12.

(Effect 4) The controller 11 may include the estimated time calculator 41. The estimated time calculator 41 calculates the estimated time until the trailer angle 4 equals the jackknife angle 13 by using the trailer angular velocity. A passenger can thereby monitor the trailer angle 4 based on the calculated estimated time, and perform various controls to the vehicle 1.

(Effect 5) The controller 11 may include the brake operation part 44. When the estimated time calculated by the estimated time calculator 41 is equal to or smaller than the first set time, the brake operation part 44 sends the brake operation signal 43 to the automatic brake system 21 of the vehicle 1 to emergently stop the vehicle 1. By emergently stopping the vehicle 1 with the brake operation of the automatic brake system 21, the jackknife pheromone of the vehicle 1 can be automatically avoided.

(Effect 6) The controller 11 may include the emergency steering part 47. When the estimated time calculated by the estimated time calculator 41 is equal to or smaller than the second set time shorter than the first set time, the emergency steering part 47 sends the emergency steering signal 46 to the automatic steering system 22 of the vehicle 1 to perform the emergency steering in the direction in which the trailer angle 4 decreases. The jackknife phenomenon of the vehicle 1 can be automatically avoided by performing the emergency steering with the automatic steering system 22 even if the jackknife phenomenon cannot be avoided only by the brake of the automatic brake system 21.

(Effect 7) The controller 11 may include the steering regulator 53. The steering regulator 53 sends the steerable area regulation signal 52 to the automatic steering system 22 of the vehicle 1 to regulate the steerable area 51 of the vehicle 1 within the inside area 16 of the alarm angles 14 (or steering allowable area 31). The automatic steering system 22 thereby performs the automatic steering only within the range without exceeding the alarm angles 14 (or jackknife angle 13), so that the jackknife phenomenon of the vehicle 1 can be avoided in advance.

(Effect 8) The controller 11 may include the steering limit angle calculator 62. The steering limit angle calculator 62 calculates the steering limit angle 61 for avoiding the jackknife phenomenon while the automatic steering system 22 performs the reversing assist of the vehicle 1. The superimposed display part 17 narrows the steerable area 51 close to the steering limit angle 61 and displays the narrowed steerable area 51 on the monitor 12. The steering limit angle calculator 62 sends the steerable area regulation signal 60 for regulating the steerable area 51 of the vehicle 1 within the limit area 63 narrowed by the steering limit angle 61 to the automatic steering system 22 through the steering regulator 53. The automatic steering system 22 limits the steerable area 51 of the vehicle 1 within the limit area 63 narrowed by the steering limit angle 61 based on the steerable area regulation signal 60.

The steerable area 51 by the automatic steering system 22 can be thereby limited within the limit area 63 narrowed by the steering limit angle 61, and the steering at a large angle and the large steering are avoided. When the automatic steering system 22 performs the increase operation 64 with the steering at a large angle and the large steering in order to control the trailer angle 4 to 0 degree in an early stage, for example, during the reversing assist by the automatic steering system 22, the steering amount in the increase operation 64 can be regulated, so that the jackknife phenomenon of the vehicle 1 due to the increase operation 64 can be prevented.

Although the present disclosure has been described in terms of an exemplary embodiment, it should not be limited thereto. It should be appreciated that variations or modifications may be made in the embodiments described by persons skilled in the art without departing from the scope of the present invention as defined by the following claims.

What is claimed is:

1. A towing assist device comprising:
    a controller configured to assist reversing of a vehicle to which a trailer is coupled with a coupling tool; and
    a monitor configured to display a periphery of the coupling tool attached to a rear portion of the vehicle with a rear view at least when the vehicle reverses, wherein
    the controller includes
    an alarm angle calculator configured to calculate an alarm angle equal to or smaller than a jackknife angle causing a jackknife phenomenon by the vehicle and the trailer in reversing,
    an alarm generator configured to give an alarm when a trailer angle between the vehicle and the trailer is equal to or larger than the alarm angle,
    an estimated time calculator configured to calculate an estimated time until the trailer angle equals the jackknife angle by using a trailer angular velocity,
    an emergency steering part configured to send an emergency steering signal to an automatic steering system mounted on the vehicle in order to perform emergency steering of the vehicle in a direction in which the trailer angle decreases when the estimated time calculated by the estimated time calculator is equal to or smaller than a first set time, and
    a brake operation part configured to send a brake operation signal for emergently stopping the vehicle to an automatic brake system mounted on the vehicle when the estimated time calculated by the estimated time calculator is equal to or smaller than a second set time, wherein the first set time is shorter than the second set time.

2. The towing assist device according to claim 1, wherein the controller includes a superimposed display part configured to superimpose at least a part of an inside area inside the alarm angle onto a position of the coupling tool to be displayed on the monitor.

3. The towing assist device according to claim 2, wherein the alarm angle calculator regularly updates the alarm angle by using at least one of a vehicle speed of the vehicle, an acceleration of the vehicle, a steering angle of the vehicle, and the trailer angular velocity of the trailer based on the jackknife angle, and
    the superimposed display part sequentially displays at least a part of the inside area of the updated alarm angle on the monitor.

4. The towing assist device according to claim 2, wherein the controller includes a steering regulator configured to send a steerable area regulation signal to the automatic steering system mounted on the vehicle in order to regulate a steerable area of the vehicle within the inside area of the alarm angle.

5. The towing assist device according to claim 4, wherein the controller includes a steering limit angle calculator configured to calculate a steering limit angle for avoiding the jackknife phenomenon while the automatic steering system assists the reversing of the vehicle,
    the superimposed display part narrows the steerable area close to the steering limit angle and displays the narrowed steerable area on the monitor, and
    the steering limit angle calculator sends the steerable area regulation signal from the steering regulator to the automatic steering system in order to regulate the steerable area of the vehicle within a limit area narrowed by the steering limit angle.

* * * * *